(12) United States Patent
Ehsani (10) Patent No.: US 11,000,987 B2
(45) Date of Patent: May 11, 2021

(54) REINFORCEMENT OF STRUCTURES USING 3D-FABRIC WRAP

(71) Applicant: Mohammad Reza Ehsani, Tucson, AZ (US)

(72) Inventor: Mohammad Reza Ehsani, Tucson, AZ (US)

( * ) Notice: Subject to any disclaimer, the term of this patent is extended or adjusted under 35 U.S.C. 154(b) by 839 days.

(21) Appl. No.: 15/001,538

(22) Filed: Jan. 20, 2016

(65) Prior Publication Data
US 2017/0203496 A1 Jul. 20, 2017

(51) Int. Cl.
*B29C 63/00* (2006.01)
*B32B 7/12* (2006.01)
(Continued)

(52) U.S. Cl.
CPC ...... *B29C 63/0073* (2013.01); *B29C 63/0021* (2013.01); *B29C 63/02* (2013.01);
(Continued)

(58) Field of Classification Search
CPC ..... B29C 65/00; B29C 65/48; B29C 65/4835; B29C 66/00; B29C 66/5221; B29C 66/5227; B29C 66/52271; B29C 66/52272; B29C 66/72; B29C 66/721; B29C 66/723; B29C 73/10; B29C 63/06; B29C 63/08; B29C 63/10; B29C 63/105; B29C 63/12; B29C 63/14; B29C 63/0021; B29C 63/02; B29C 63/30; B29C 63/0073; E04G 23/0218; E04G 23/0225; E04G 2023/0251; F16L 55/16; F16L 55/162; F16L 55/163; F16L 55/1656; F16L 55/168; F16L 55/1683; F16L 55/1686; F16L 55/17; B29L 2023/22; B32B 2250/05; B32B 2250/20; B32B 2250/40; B32B 2255/02;
(Continued)

(56) References Cited

U.S. PATENT DOCUMENTS 5,503,695 A * 4/1996 Imoto ............... B29C 63/34
156/287
5,534,318 A * 7/1996 Andre De La Porte ..............
B29C 70/00
220/562

(Continued)

FOREIGN PATENT DOCUMENTS

JP 2013256738 A * 12/2013 ............... D04B 1/22

*Primary Examiner* — Philip C Tucker
*Assistant Examiner* — Brian R Slawski (57) ABSTRACT

A method and an article of manufacture are disclosed for reinforcing various structures, such as pipes, ducts, vessels, tanks, silos, chimneys, columns and the like, constructed from various materials including steel, concrete, masonry, wood, plastics, and the like. Some of the various structures may be used to transport water, gas, oil, and the like. Multiple layers of various material sheets, each sheet having substantially the same or different properties, may be wrapped around or be attached to the inside of a structure to be reinforced. The multiple layers together constitute a structure reinforcement wrap (SRW) and in an embodiment it may include a 3D fabric layer surrounded by other reinforcement layers to reinforce the structure against external and internal loads, such as weight, impact load, blast load, internal pressure, ballistic load, and the like. In some embodiment the SRW may only include 3D fabric layers.

13 Claims, 5 Drawing Sheets

Sec. E-E, External Wrap (51) Int. Cl.
  *B32B 3/06* (2006.01)
  *B32B 3/28* (2006.01)
  *B32B 3/12* (2006.01)
  *B32B 5/02* (2006.01)
  *B29C 63/30* (2006.01)
  *B29C 63/02* (2006.01)
  *B32B 5/24* (2006.01)
  *B32B 5/26* (2006.01)
  *B32B 5/12* (2006.01)
  *B29L 23/00* (2006.01)

(52) U.S. Cl.
  CPC ............ *B29C 63/30* (2013.01); *B32B 3/06* (2013.01); *B32B 3/12* (2013.01); *B32B 3/28* (2013.01); *B32B 5/022* (2013.01); *B32B 5/12* (2013.01); *B32B 5/24* (2013.01); *B32B 5/26* (2013.01); *B32B 7/12* (2013.01); *B29L 2023/22* (2013.01); *B32B 2250/05* (2013.01); *B32B 2250/20* (2013.01); *B32B 2250/40* (2013.01); *B32B 2255/02* (2013.01); *B32B 2255/26* (2013.01); *B32B 2260/023* (2013.01); *B32B 2260/046* (2013.01); *B32B 2262/0269* (2013.01); *B32B 2262/062* (2013.01); *B32B 2262/101* (2013.01); *B32B 2262/103* (2013.01); *B32B 2262/106* (2013.01); *B32B 2307/306* (2013.01); *B32B 2307/50* (2013.01); *B32B 2307/54* (2013.01); *B32B 2307/554* (2013.01); *B32B 2307/558* (2013.01); *B32B 2307/582* (2013.01); *B32B 2307/5825* (2013.01); *B32B 2307/714* (2013.01); *B32B 2307/718* (2013.01); *B32B 2307/7242* (2013.01); *B32B 2307/7265* (2013.01); *B32B 2307/732* (2013.01); *B32B 2571/00* (2013.01); *B32B 2597/00* (2013.01)

(58) Field of Classification Search
  CPC .......... B32B 2255/26; B32B 2260/023; B32B 2260/046; B32B 2262/0269; B32B 2262/062; B32B 2262/101; B32B 2262/103; B32B 2262/106; B32B 2307/306; B32B 2307/50; B32B 2307/54; B32B 2307/554; B32B 2307/558; B32B 2307/582; B32B 2307/5825; B32B 2307/714; B32B 2307/718; B32B 2307/7242; B32B 2307/7265; B32B 2307/732; B32B 2571/00; B32B 2597/00; B32B 3/06; B32B 3/12; B32B 3/28; B32B 5/022; B32B 5/12; B32B 5/24; B32B 5/26; B32B 7/12
  USPC ....... 156/60, 71, 83, 94, 148, 149, 184, 185, 156/187, 188, 190, 195, 278, 280, 293, 156/307.1, 307.3, 307.7; 138/97, 98, 99
  See application file for complete search history.

(56) References Cited

U.S. PATENT DOCUMENTS

| | | | | |
|---|---|---|---|---|
| 5,974,784 | A * | 11/1999 | Feldman | B01D 53/94 60/272 |
| 6,688,338 | B2 * | 2/2004 | Meli | F16L 13/0272 138/123 |
| 2008/0277013 | A1 * | 11/2008 | Anders | F16L 55/1656 138/98 |
| 2011/0206920 | A1 * | 8/2011 | Ehsani | B32B 27/12 428/304.4 |
| 2014/0298656 | A1 * | 10/2014 | Ehsani | E04G 23/0218 29/897 |
| 2015/0361596 | A1 * | 12/2015 | Valerie | D03D 13/004 428/34.5 |

* cited by examiner (Fig. 2A): Sec. E-E, External Wrap (Fig. 2B): Sec. E-E, Internal Wrap

REINFORCEMENT OF STRUCTURES USING 3D-FABRIC WRAP

CROSS-REFERENCE(S) TO RELATED APPLICATION(S)

This application claims the benefit of the filing date of the U.S. Provisional Patent Application No. 62/175,632, filed on Jun. 15, 2015, the disclosure of which is hereby expressly incorporated by reference in its entirety, and the filing date of the Provisional Application is hereby claimed under 35 U.S.C. § 119(e). This application is also related to the U.S. patent application Ser. No. 13/077,854, filed on Mar. 31, 2011.

TECHNICAL FIELD

This application relates generally to construction. More specifically, this application relates to a method and apparatus for reinforcing structures with a structure reinforcement three dimensional wrap.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references using a honeycomb laminate, 3D fabric and/or hollow-structure laminate surrounded by one or more layers of reinforcement material sheets to reinforce cylindrical structures, such as pipes, it will be appreciated that the disclosure may include fewer or more laminate sheets to reinforce other types of structures, such as walls, chambers, columns, and the like.

Briefly described, a method and an article of manufacture are disclosed for reinforcing various structures, such as pipes, ducts, vessels, tanks, silos, industrial chimneys, columns, and the like, constructed from various materials including, but not limited to steel, concrete, masonry, wood, plastics, and the like. Some of the various structures may be used to transport water, gas, oil, hot air, and the like, while other such various structures may be used as storage, human-occupied buildings, computer and equipment facilities, and the like. Multiple layers of various material sheets, each sheet having substantially the same or different properties, may be wrapped around or otherwise attached to a surface of a structure to be reinforced. The multiple layers together constitute a structure reinforcement wrap (SRW) and may include at least a 3D fabric layer surrounded by other reinforcement layers to reinforce the structure against external and internal loads. In some embodiments all layers may be 3D fabrics. Such loads include weight, impact load, fluid load, blast load, internal pressure, ballistic load, and the like. In various embodiments, SRW includes multiple 3D fabric layers and multiple reinforcement sheets layered in various configurations and orders.

Structural repair can be expensive, cumbersome, and time consuming. Structures can get damaged due to a variety of factors, such as earthquakes, overloading, weight of traffic, wear and tear, corrosion, explosions, internal fluid or gas pressure, and the like. Prevention is generally more cost-effective than repairs. As such, it is generally easier and more cost-effective to strengthen a structure that may be exposed to damaging forces and loads, than waiting to repair such eventual damages after they occur or to replace the structure with a new one. Intentional damage inflicted upon infrastructure, by terrorism or vandalism, is another way that structural damage may result. For example, recently, there has been growing interest to strengthen the above-mentioned structures for blast loading, such as terrorist attacks, which may seek to blow up a gas or oil pipeline or a main column under a building by placing a bomb adjacent to the pipeline or column and detonating it. In addition to prevention, if damage does occur to a structure, a cost-effective and speedy method of repair is clearly desirable.

One of the problems with existing pipes and culverts, such as corrugated metal pipes placed in infrastructure like under roads, is that they are subject to corrosion that weakens these structures. Since these culverts and pipes may be buried in soil, it is more cost-effective and thus preferred to repair them without digging them out. Often, these culverts are subjected to traffic, soil, and backfill loads from above. Thus a repair material and method should not only provide protection against corrosion, but also provide additional strength for the culvert. This is often referred to as ring stiffness; thus the new repair material should enhance the ring stiffness of the culvert.

In many cases, the topside or crown portion of a buried pipe, such as a sewer pipe, may become deteriorated due to presence of $H_2S$ (Hydrogen Sulfide) gases or other conditions leading to corrosion of reinforcing steel components (rebar) in the structures around or in the pipe. These gases also react with the concrete on the crown portion of the pipe, converting the concrete into a powdery material that could ultimately lead to the collapse of the pipe. Usually, the invert or bottom portion of these pipes, which may be substantially always covered under water, thus preventing contact with $H_2S$, does not get damaged. There are products currently on the market, such as a products by Ameron International known as T-Lock Lining™, Arrow-Lock® and T-Hab™ for new construction and repair of damaged topside of existing structures. However, these products generally have limited stiffness and because of their flexibility, they must be supported from below by an elaborate system of frames and/or formwork, as described in their respective commercial literature, adding to their cost, ineffectiveness, and difficulty of application.

Figures 1A, 1B, 1C, 1D:
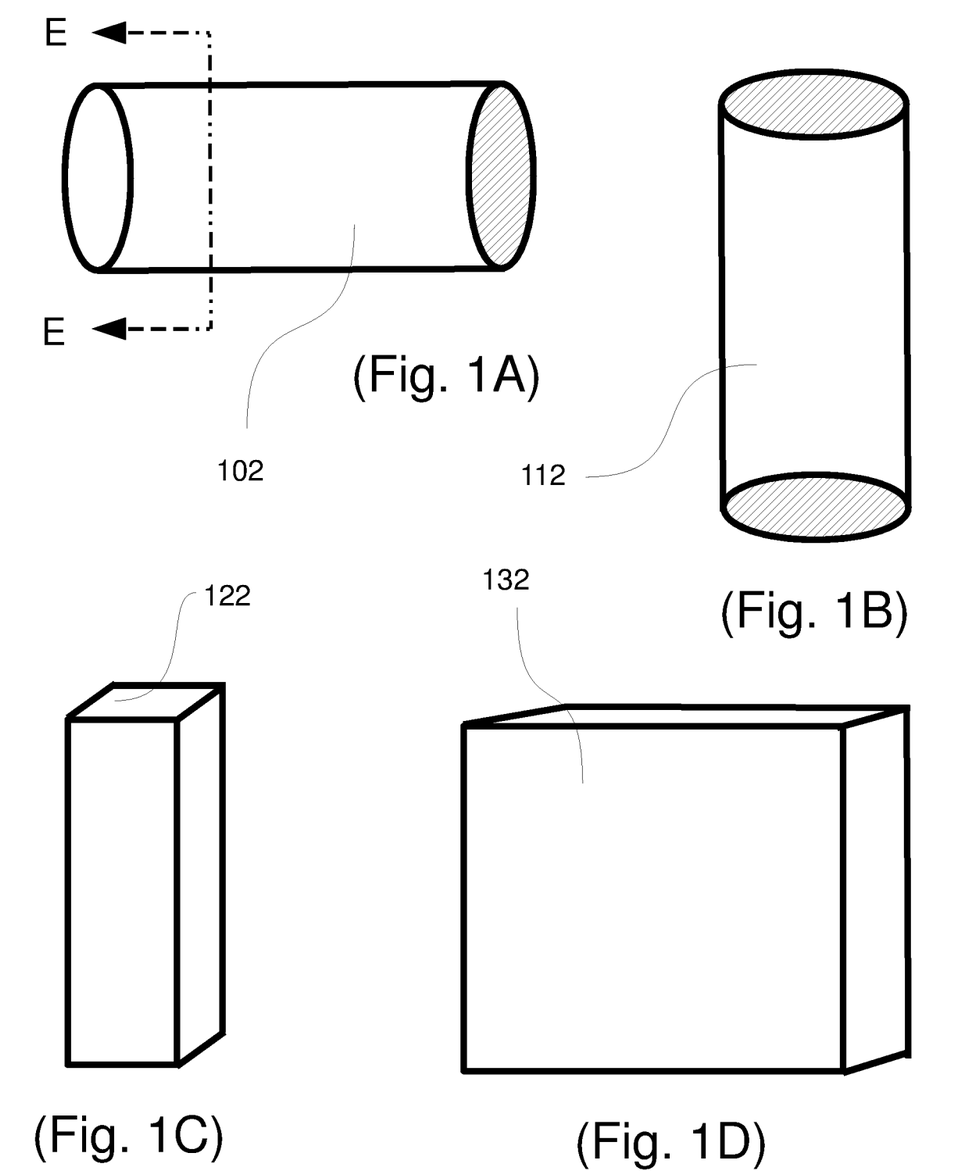
FIGS. 1A-1D show example structures suitable to be reinforced with reinforcement wrap.

FIGS. 1A-1D show example structures suitable to be reinforced with reinforcement wrap. FIG. 1A shows a cylindrical pipe or column 102 in a horizontal position, while FIG. 1B shows cylindrical structure 112, such as a pipe, a column, a silo, a chimney, and the like. A section E-E of FIG. 1A is shown in greater detail in FIGS. 2A and 2B. FIGS. 1C and 1D show structures 122 and 132 with rectangular cross-sections, such as walls, chambers, and square columns. Any of these structures may be reinforced by the SRW laminates. Structures of relatively smaller sizes and accessible configurations, such as pipes and columns, may be wrapped with SRW laminate, while relatively larger and/or inaccessible structures such as walls, entire buildings, and the like may be augmented with SRW laminates on their surfaces, which may be exposed to potentially damaging loading, such as external wall surfaces. Those skilled in the art will appreciate that the structure to be reinforced may have any cross sectional shape in addition to round and rectangular, such as triangular, oval, polygonal, irregular, and the like.

Figure 2A:
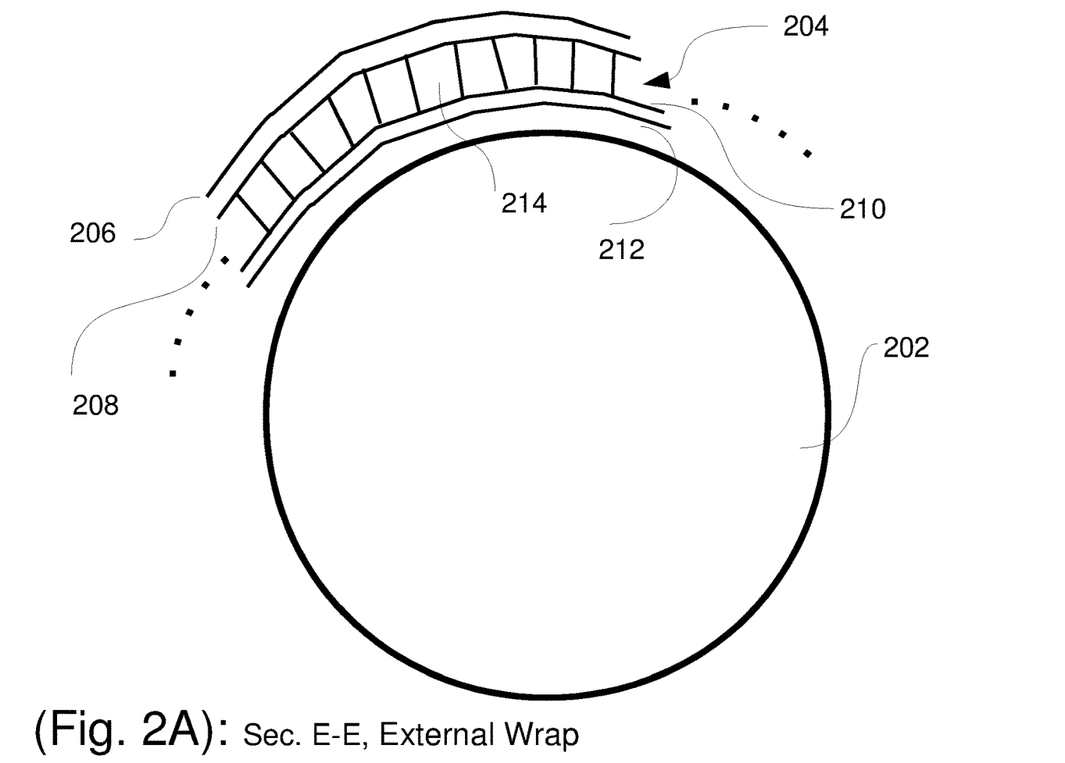
FIG. 2A shows an example external structure reinforcement using structure reinforcement wrap (SRW)

FIG. 2A shows an example external conduit-structure reinforcement using structure reinforcement wrap. Section E-E of FIG. 1A is depicted in FIG. 2A. In various embodiments, structure 202 is wrapped, covered, or augmented with SRW laminate constructed from and including reinforcement layers 206, 208, 210, 212, and 3D fabric layer 214. 3D fabric layer 214 may be laminated with at least two skin layers, for example, layers 208 and 210 to form a 3D fabric or hollow laminate 204.

In various embodiments, structure 202, which may be a pipe, a culvert, a column, a wall, or other similar structure, is reinforced by multiple layers of reinforcement sheets including 3D fabric or hollow-structure layer 214.

A 3D fabric is a special type of fabric made with glass, carbon, or Kevlar reinforcing fibers. These fabrics, as illustrated in FIG. 4D, for example, are woven as two fabric layers 430 and 440 that are internally connected with short fibers 450 of glass, carbon or Kevlar fibers. During application of 3D fabrics, both layers 430 and 440 of fabric can be saturated with a resin such as epoxy, polyester or vinyl ester at the same time. The unique features of 3D fabrics is that while the resin cures, the short fibers 450 rise, causing further separation between the two layers 430 and 440 of fabric. This results in a cured three-dimensional structure with a certain thickness and stiffness that is more than the thickness and stiffness of the 3D fabric before the application of the resin.

The resulting thickness, after the application of resin, is determined by the length of the short fibers connecting the two fabric layers together. Typical fiber lengths are 2 to 20 mm. I-beams are commonly used in construction where the two flanges are separated by a web. The short fibers in a 3D fabric work similar to the web of an I-beam. The result is a structure that is much stiffer and stronger than if the two layers of fabric were directly bonded together without any separation between them. 3D fabrics are available through a small number of manufacturers worldwide including Jushi Beihai Fiberglass Co., LTD in China. Additionally, the hollow space between the two faces of the 3D fabric may be filled with various filler materials such as foam, rubber, resin, concrete and the like.

In various embodiments, the reinforcement sheet is constructed from fiber-reinforced material, such as Fiber Reinforced Polymer (FRP) to give the sheets more resistance against various types of loading, such as blast loading. Those skilled in the art will appreciate that many types of reinforcement fibers may be used for reinforcement including polymer, fiberglass, metal, cotton, other natural fibers, and the like. The sheet materials may include fabrics made with fibers such as glass, carbon, Kevlar, Nomex, aluminum, and the like, some saturated with a polymer such as polyester, vinyl ester, or epoxy for added strength, wear resistance, and resilience. The fibers within a reinforcement sheet may be aligned in one direction, in cross directions, randomly oriented, or in curved sections to provide various mechanical properties, such as tearing tendency and differential tensile strength along different directions, among others.

The reinforcement layers may be laminated in the field using epoxy, various glues, or similar adhesives to create a thick laminate that will be stiffer than the sum of the individual reinforcement layers 206, 208, 210, 212 placed around structure 202. Different reinforcement layers may use sheets with fibers oriented in different directions, such as orthogonal directions, with respect to other sheets to further reinforce the SRW.

With continued reference to FIG. 2A, reinforcement sheets 206-214 are available from industrial sources and range in thickness from about 0.020 inches to a few inches depending on application. Those skilled in the art will appreciate that thinner or thicker sheets may be constructed and used as needed. 3D fabric or hollow structure itself is available in various geometrical cell shapes, as further described with respect to FIG. 4A-4D below, and it provides cells that when sandwiched between a first and a second 3D fabric skin layers made from thin reinforcement sheets results in a light-weight but stiff laminate sheet, like 3D fabric laminate 204, with many applications, such as in the construction of columns, the fluid storage tanks, floor of commercial aircraft, fuselage of fighter planes, and watercraft. This 3D fabric laminate layer structure provides additional strength to SRW and may serve as a structure to dissipate impact and blast energy, resulting in less damage to the reinforced structure 202. SRW may be wrapped continuously or in sections around the entire outside surface of structure 202 like a wide tape to create a closed, overlapping or non-overlapping multi-layered shell enclosing structure 202. In various embodiments the wrapping may be spirally or otherwise and the wrapped layers may overlap or not.

In various embodiments, multiple 3D fabric laminates 204 may be employed to further reinforce SRW. Various layers in the SRW may be glued to each other to form one integral laminate wrap. In some embodiments, each layer in the SRW may be made from a different or same type of reinforcement sheet to develop different costs, performances, and mechanical properties for the SRW. For example, the outer layers may be made from thicker and tougher reinforcement sheets while the inner layers (closer to the structure) may be made from thinner and more flexible sheets to save material and installation or construction costs. Other variations in sheet layers are possible, such as fiber types and orientations, sheet materials, sheet material properties like chemical resistance, heat resistance, gas and fluid impermeability, and the like. SRWs made with such variations in reinforcement layers will exhibit different mechanical and chemical properties suitable for different applications, costs levels, and considerations such as environmental and public safety considerations. In various embodiments only a 3D fabric such as 204 may be used to wrap the structural member, without the addition of 206 and 212 layers.

In some embodiments after each layer of the 3D fabric is resin saturated and wrapped around the structure, the 3D fabric may need adequate time to change its thickness to its maximum or ideal thickness before further layers are added. In various embodiments the 3D fabric may either be resin-saturated before being wrapped around the structure or after it is wrapped. In some embodiments and with some 3D fabrics, the preparation time of a subsequent layer may provide sufficient time for the desired thickness increase of the previous layer, while in other embodiments and with other 3D fabrics the work crew may have to wait a few minutes or a few hours before wrapping more SRW layers around the structure.

Some multi-layer embodiments may be assembled and integrated prior to their application to a structure or may be integrated during their application to the structure.

In other various embodiments, some or all of the 3D fabric or hollow-structure cells may be filled with one or more of a filler material, such as foam, concrete, polymer, and the like to displace the air within the cells and provide additional strength to the 3D fabric, honeycomb or hollow-structure layer. The cell filling material may be injected or otherwise be placed within the cells after attaching the first 3D fabric or hollow-structure skin layer, for example 208, and then be covered and glued in place with the second skin layer, for example 210. The skin layers 208 and 210 themselves may be multi-layered in some embodiments.

In various embodiments, the reinforcement layers are applied to the surface of the structure one layer at a time using appropriate adhesives. 3D fabrics are flexible prior to curing and can be easily applied to a curved surface such as the outside and/or inside surface of a pipe. As the resin cures, the top layer of the fabric that is free rises by a distance equal to the height of the short fiber piles, to form a three-dimensional structure with an interior cavity space. Some resins that cure slowly may require a few hours for the two fabric layers to reach their maximum separation distance. If desired, a faster setting resin or other means such as heat, UV light, etc. can be used to accelerate the curing of the resin and the separation process. Additional 3D fabric layers or additional reinforcement layers may be applied to structure 202 to provide further strength for the structure. In various embodiments, at least a first layer of thin laminate may be wrapped around or applied to the structure, then a layer of 3D fabric may be glued or otherwise attached to the first layer of thin laminate, and finally at least a second layer of thin laminate sheet may be glued to the top face of the 3D fabric. In some embodiments the first layer may be wrapped around the structure at a distance from the surface of the structure to create an annular space between the SRW and the structure to be later filled with a filler material such as resin, concrete or grout. In these embodiments the filler material will also help filling any voids in the structure.

In some embodiments, it may be sufficient to apply only a single layer of resin-saturated 3D fabric directly to the surface of the structure. Once the resin cures and the fabric rises to its final or desired thickness, the resulting structure may be strong enough to resist all loads without the need for application of any additional reinforcement layers. In various embodiments the thin laminates wrapped around the structure before and after each 3D fabric wrapping may already be manufactured surfaces of a 3D fabric or be attached by the user to either or both sides of a 3D fabric before wrapping them around the structure.

Figure 2B:
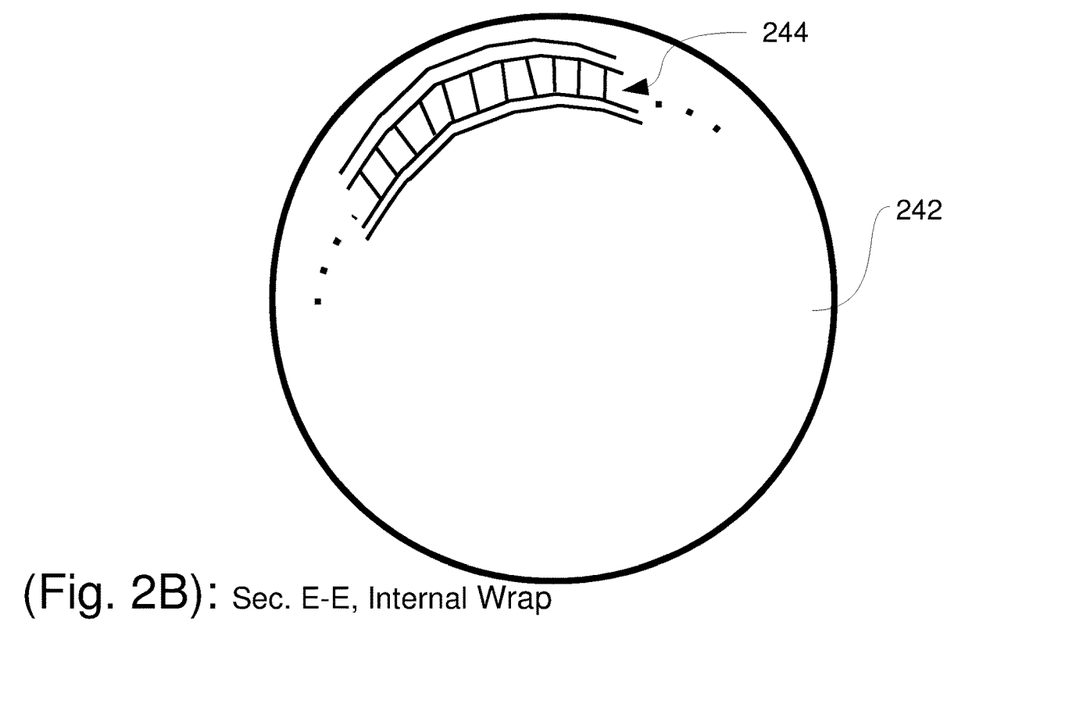
FIG. 2B shows an example internal structure reinforcement using SRW.

FIG. 2B shows an example internal structure reinforcement using SRW. The internal surface of structure 242 may be internally wrapped or covered with SRW 244 substantially in the same manner as described above with respect to FIG. 2A. The SRW layers used are also substantially as described above with respect to FIG. 2A. For various structures, particularly for pipes, the internal reinforcement may be used to resist internal pressures, such as fluid and gas pressures, and also to resist and/or repair corrosion and wear and tear. Additional layers of reinforcement sheets or 3D fabric structures may be included in the SRW to provide the required strength and ring stiffness per engineering design requirements for external loads from soil, traffic, and the like Layers of SRW 244 may be applied continuously inside structure 242 to create a closed multi-layered reinforcement structure. In embodiments in which a pipe is damaged and the reinforcement layer needs to be impermeable, a coat of impervious sealing materials such as resin, polyurea or paint is sprayed on the inside surface of the SRW to ensure that not even a pinhole remains in the reinforcement layer from which the liquid content of the pipe can escape. In these embodiments, the coating materials used depend on the chemical and/or thermal characteristics of the liquid passing through the pipe and its requirements. For example the coating for a pipe carrying potable water may not be the same as a pipe carrying petroleum products.

In some embodiments, the 3D fabric may be provided in narrow bands, e.g. 12-24 inches wide, and these bands are continuously installed in a spiral manner, either overlappingly or non-overlappingly around the outside or on the inner surface of the pipe to create a cylindrical shell. In some embodiments it is preferred to have the edges of the spiral bands butting against each other to eliminate any overlap or gap between adjacent layers of 3D fabric.

The SRW may be applied to various structures, such as columns, pipes or culverts, using automated machinery, such as robotic apparatus to facilitate and automate the installation of the SRW inside or outside a pipe or other structure. Such robotic apparatus may be used to provide further economical advantage for all applications described herein.

Figure 3:
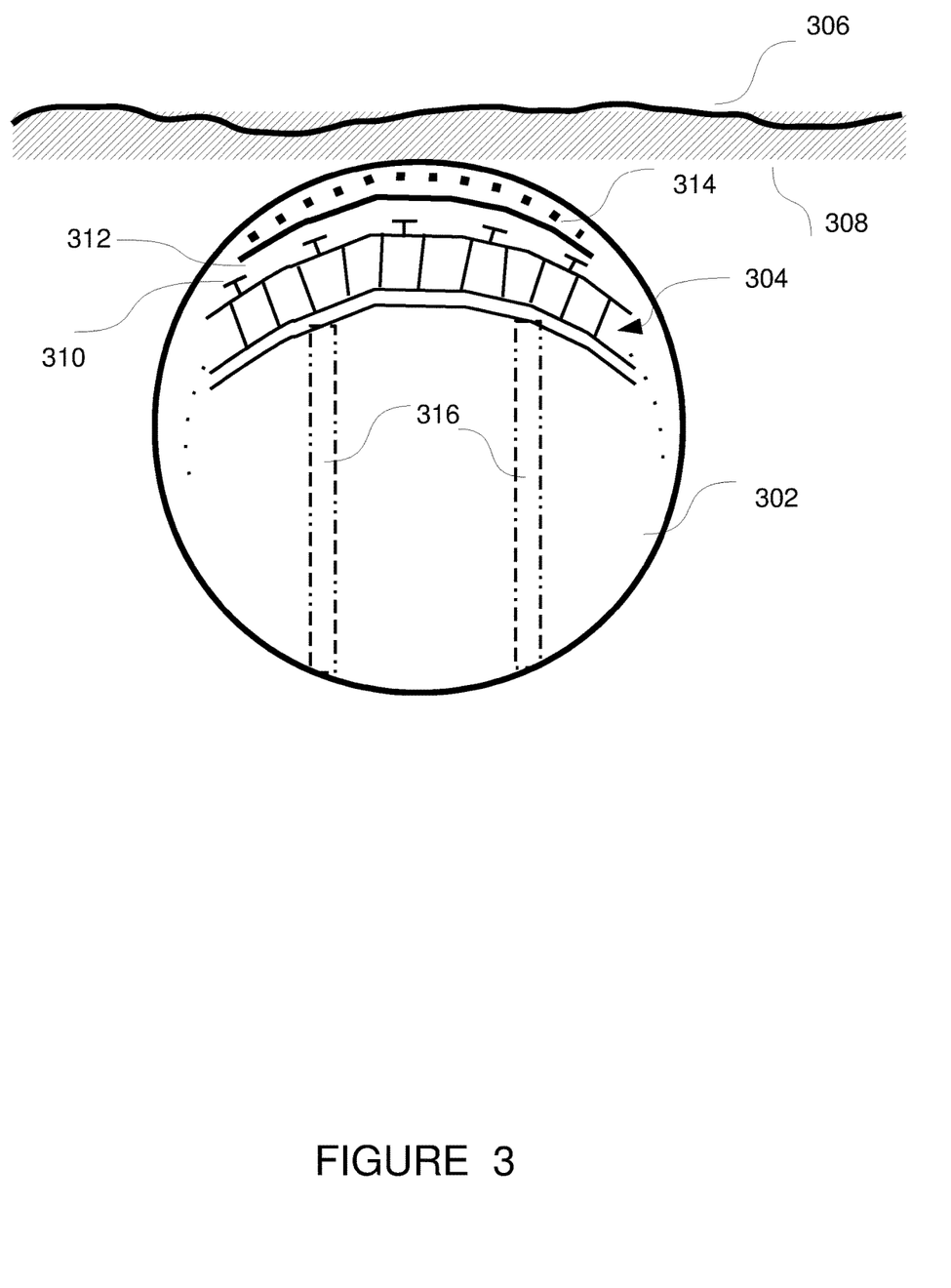
FIG. 3 shows an example internal structure reinforcement using SRW configured to support external forces.

FIG. 3 shows an example internal structure reinforcement using SRW configured to support external forces. A structure, such as pipe 302 buried under ground surface 306, covered with soil 308 to a certain depth, is reinforced with SRW 304. T-section attachment components 310 may be used to further reinforce and stiffen SRW 304. T-section attachment components 310 are generally in the form of elongated beams (T-shape cross section shown in FIG. 3), having "T-shaped", "I-shaped", or other similar cross sectional shapes, which may be oriented along the length of the pipe, in hoop direction, diagonally around the pipe, or in a random fashion. In various embodiments, the top-side of the buried pipe or structure 302 may be further reinforced with concrete and rebar components, such as hoop rebar 312 and axial rebar 314. In certain circumstances temporary support columns 316 may be used during repair to support the weight of the concrete on the top-side of the structure before the concrete hardens and cures. The T-section components may be deployed in wet concrete, in a manner similar to rebars, to effectively attach and integrate the SRW with the concrete on top, to further reinforce and stiffen the combination.

When concrete is poured on the top-side of a buried structure, such as a pipe, to repair and/or to reinforce the structure, a stiff SRW may be used to support the weight of the fresh concrete or grout that is placed around it before the concrete sets and cures. SRW may fully or partially eliminate the elaborate framework that is often necessary with the products currently on the market used to support concrete repair and/or reinforcement applications. In one embodiment, SRW may be used in the upper arch portion of the pipe, such as the top 240 degrees or nearly two-thirds of the pipe's circumference. The ends of the SRW at the edges of the upper arch portion of the pipe may be supported along the length of the pipe. The upper part of SRW 304 may be attached to anchoring/locking devices, such as T-section attachment components 310. Concrete reinforcing components, such as rebar components may be placed in the space between the top of SRW and the top of the pipe as shown in FIG. 3. This area may then be filled with concrete or grout and the weight of the wet concrete can be supported by SRW along the length of the pipe. If additional support is needed while the concrete or grout is being cured, temporary shoring or support columns 316 may be used.

This process may be repeated in sections along the length of the pipe in an incremental manner until the entire pipe is reinforced. The edges of the SRW sections along the length of the pipe may be overlapped and sealed to ensure that the 3D fabric laminate creates a virtually airtight ceiling for the pipe so that the $H_2S$ gases or other gases, liquids, or corrosive elements are substantially prevented from reaching the newly placed concrete or grout. The joints between SRW sections along the length of the pipe may be joined shut using epoxy or thermal techniques.

The 3D fabric laminate structure 304 itself may include a lower portion on the face away from the pipe's internal surface, which is made of a material including but not limited to vinyl ester reinforced with carbon or glass fibers that are highly resistant to gases and chemicals, which may be present in the pipe. This repair procedure allows the construction of a new ceiling for the upper portion of the pipe, which is very strong and corrosion resistant for a long service life and is able to carry high traffic and other loads from above. For example, the 3D fabric may include a sheet made with carbon fiber and another sheet made with glass fiber, where these two sheets are connected together with short piles made with Kevlar fibers.

In various other embodiments, the procedures described above with respect to FIG. 3, may be combined to build a new reinforced pipe inside an old or original pipe. This new pipe may be substantially concentric with the original pipe. The annular space between the old pipe and the new 3D-fabric pipe may be filled with grout or concrete and may also be reinforced with reinforcing material such as steel rebar components as described above. Such rehabilitated pipe will have an inner surface that is made with a corrosion resistant honeycomb laminate. It also provides significant strength for the old pipe by way of increased ring stiffness.

In yet other embodiments, the 3D fabric structure and the protruding T-section attachment components 310 may be pressed against a layer of mastic, cement paste, other epoxy, or polymer material that has been applied onto the surface of the pipe. In addition to strengthening pipes, other cylindrical structures such as chimneys, tanks and silos may be strengthened with this technique. The described 3D fabric or hollow structure, for example, when applied to the inside surface of an industrial or residential chimneys may provide a lining that is chemically and thermally resistant. Furthermore, such SRW-based internal lining will have very high ring stiffness and may prevent further erosion and deterioration of the interior surface of the chimney. The liner may also hold and push back the deteriorated interior surface of the chimney against the wall of the chimney and prevent any crumbling pieces from falling into the chimney and in general strengthens the structural integrity of chimneys.

In various embodiments, rectangular celled hollow structures may be advantageous during installation. In such rectangular celled hollow structures the short side of the cells' rectangles are more deformable and flexible in a perpendicular direction to the short side and stiffer along the short side. This directional flexibility allows easier and better fitting wrapping of the hollow structures laminate and/or the SRW around a small circumference or sharper structural bends.

In other various embodiments, PVC sheets that are available on the market and include attachment protrusions, such as T-section attachment components, may be used as one facial sheet of the aforementioned 3D fabric and hollow structures. By bonding these sheets to the 3D fabric that has a flat laminate sheet on the opposite face, a much stiffer system results that may eliminate the need for temporary support forms otherwise needed. Even if the support columns 316 are needed during the repair process, such T-section attachment components provide a gripping mechanism, which allow the SRW to become an integral part of the concrete that is placed above the SRW, so that the combination of the SRW and concrete on top become substantially stronger and stiffer even after the support columns are removed.

Figure 4A:
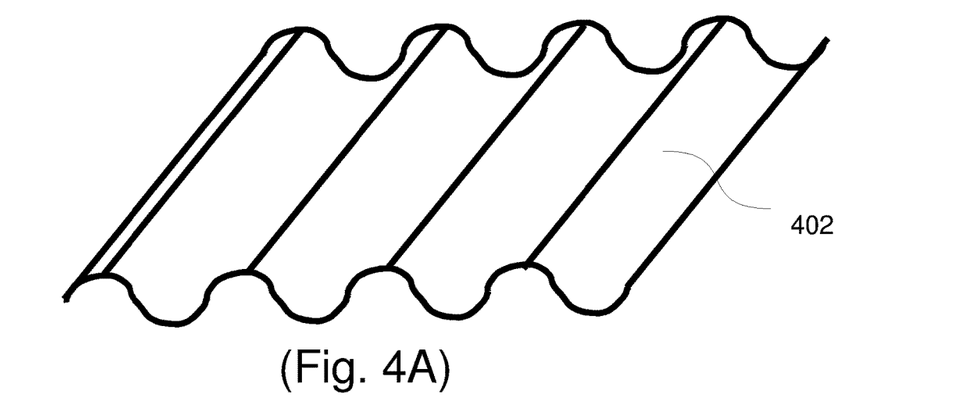
FIGS. 4A-4D show example honeycomb, 3D fabric and/or hollow layers usable as SRW components.
Figure 4B:
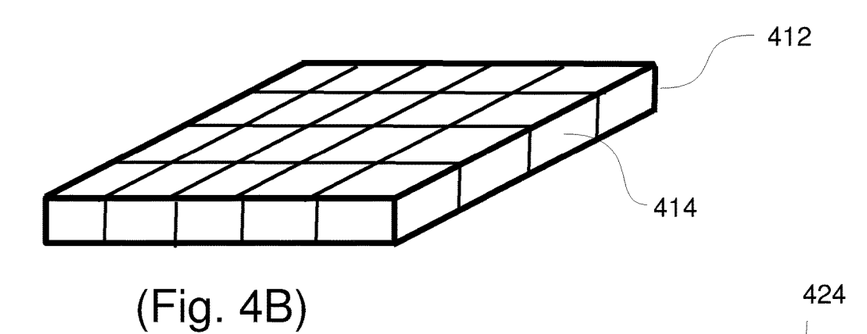
Figure 4C:
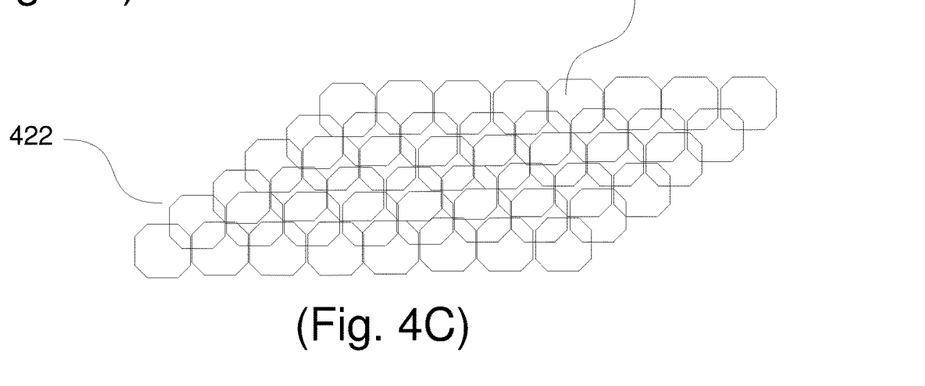
Figure 4D:
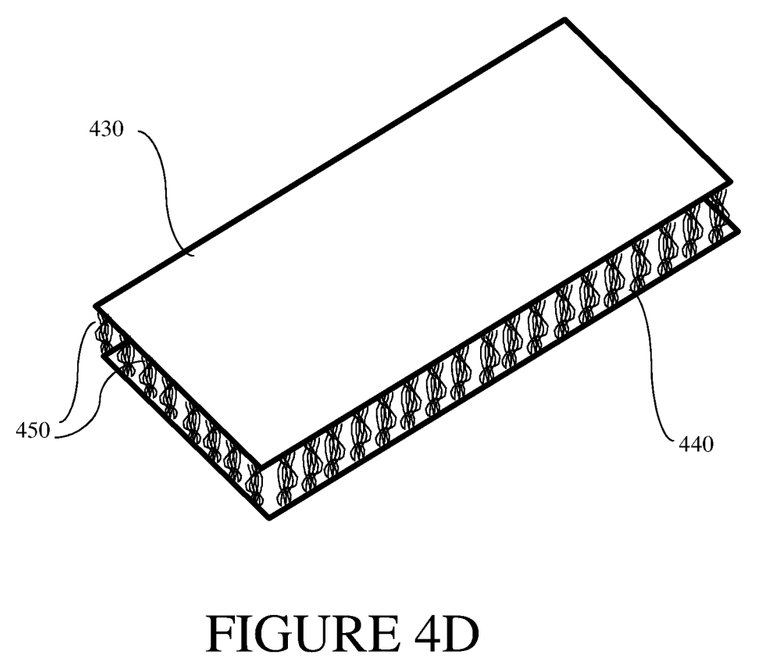

FIGS. 4A-4D show example hollow structure layers usable as SRW components. FIG. 4A shows an example corrugated structure 402 that in some embodiments may be used instead of the cell-based honeycomb layer described previously. The manufacturing and availability of such corrugated structures 402 may provide a cost advantage in some applications.

FIG. 4B shows an example square-celled honeycomb structure 414, where each cell is in the form of a square or rectangle rather than a hexagon or octagon as is typically implied by the term "honeycomb".

Honeycomb structure may be constructed from many different materials similar to those listed and described above with respect to the reinforcement sheets, such as aluminum, PVC, Kevlar, Nomex, and the like.

FIG. 4C shows an example bubble-wrap structure 424 with closed bubble cells 422. In various embodiments, closed bubble cells 422 may be filled with filler material or pressurized air or gas. In various other embodiments, bubble cells 422 may be inflatable to various adjustable pressures. In such embodiments, bubble-wrap structure 424 may be wrapped around a structure in a deflated state, as described above as one of the layers in the SRW, and then be inflated to a desired pressure to obtain a predetermined stiffness for the SRW.

FIG. 4D shows an example 3D fabric. These fabrics, for example, comprise two surface layers 430 and 440 that are internally connected with short piles 450 of glass, carbon or Kevlar fibers. The distance between the piles 450 define the width of the cells within the fabric, while the height of the piles 450 define the thickness of the fabric. In general, taller piles lead to stiffer and stronger 3D structures.

Those skilled in the art will appreciate that many other honeycomb type layers, 3D fabric, hollow structures, or laminate structures are possible without departing from the spirit of the present disclosures. For example, the honeycomb cells may be constructed in any geometric form, such as rectangle, hexagon, and the like to serve the same purpose.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A method of reinforcing a pipe with a plurality of layers comprising at least a first reinforcement sheet, a resin-saturated 3D fabric, and a second reinforcement sheet, the method comprising:
    placing the first reinforcement sheet over an inside and/or an outside surface of the pipe;
    placing the resin-saturated 3D fabric over the first reinforcement sheet, wherein the 3D fabric is resin saturated before or after being placed over an inside and/or an outside surface of the first reinforcement sheet;
    letting the resin-saturated 3D fabric change thickness to a desired thickness that is less than a maximum possible thickness of the 3D fabric; and
    placing the second reinforcement sheet over a surface of the 3D fabric when the resin-saturated 3D fabric thickness reaches the desired thickness, wherein the 3D fabric stays between the first and the second reinforcement sheets.

2. The method of claim 1, wherein the method steps are repeated to accomplish desired reinforcement.

3. The method of claim 1, wherein at least one of the three layers of the first reinforcement sheet and the resin-saturated 3D fabric and the second reinforcement sheet is adhered to an adjacent layer.

4. The method of claim 3, wherein at least one of the three layers of the first reinforcement sheet and the resin-saturated 3D fabric and the second reinforcement sheet is attached to an adjacent layer by resin.

5. The method of claim 1, wherein an empty space inside the 3D fabric is filled with filler material.

6. The method of claim 1, wherein the 3D fabric includes a first skin layer and a second skin layer.

7. The method of claim 1, further comprising a step of coating an exposed surface of the second reinforcement sheet with an impervious substance.

8. The method of claim 1, wherein the 3D fabric is resin saturated before being placed over the inside and/or the outside surface of the first reinforcement sheet.

9. A method of reinforcing and/or repairing a pipe with a plurality of layers comprising at least a first reinforcement sheet, a resin-impregnated 3D fabric layer, and a second reinforcement sheet, the method comprising:
    adhering at least a first reinforcement sheet to an inside and/or an outside surface of the pipe;
    adhering at least a resin-impregnated 3D fabric layer over the first reinforcement sheet;
    letting the resin-impregnated 3D fabric layer change thickness to a desired thickness that is less than a maximum possible thickness of the 3D fabric layer; and
    adhering at least a second reinforcement sheet to a surface of the 3D fabric layer when the resin-saturated 3D fabric layer thickness reaches the desired thickness, wherein the 3D fabric layer remains between the first and the second reinforcement sheets; and
    repeating the above steps until a desired strength of the reinforced and/or repaired pipe is achieved.

10. The method of claim 9, further comprising laminating the 3D fabric layer in a first and a second skin layer.

11. The method of claim 9, wherein the layers are used to seal at least a portion of the pipe against liquids and gases and an exposed surface of a last layer is coated with an impermeable substance.

12. The method of claim 9, wherein one or more of the layers are wrapped spirally, are wrapped overlappingly, or are wrapped spirally and overlappingly.

13. The method of claim 9, wherein at least one of the reinforcement sheets include reinforcing fibers.

* * * * *